UNITED STATES PATENT OFFICE.

FREDERICK TSCHIRNER, OF NEWARK, NEW JERSEY, ASSIGNOR TO RICHARD G. WAGNER, OF NEW YORK, N. Y.

PROCESS OF TREATING GLAUCONITE AND SIMILAR MATERIALS.

1,292,929.    Specification of Letters Patent.    Patented Jan. 28, 1919.

No Drawing. Application filed April 13, 1917, Serial No. 161,851. Renewed December 12, 1918. Serial No. 266,514.

*To all whom it may concern:*

Be it known that I, FREDERICK TSCHIRNER, a citizen of the United States, residing at Newark, in the county of Essex and State of New Jersey, have invented certain new and useful Improvements in Processes of Treating Glauconite and Similar Materials; and I do hereby declare the following to be a full, clear, and exact description of the invention, such as will enable others skilled in the art to which it appertains to make and use the same.

The present invention comprises a process of converting the potassium of glauconite, commonly called greensand and similar material into a water-soluble condition, by treatment hereinafter described.

In accordance with the process of my present invention, I heat the greensand, with a material which upon calcination leaves lime or its equivalent, which may be a material known as "lime sand," and with a chlorid such as sodium chlorid, to convert the potassium present into the chlorid, after which the material is leached to dissolve the chlorids of sodium and potassium, which materials are thereafter separated by any suitable method. In place of sodium chlorid, chlorid of the alkaline earth metals could be employed, as in my Patent No. 1,254,451.

Greensand marl is well known to consist in part of glauconite, a hydrous potassium iron silicate, in which the potassium exists in a state in which it is substantially insoluble in water. The iron is partly as ferric compounds, and partly as ferrous compounds. With the above materials are also associated varying amounts of other (and for the purposes of the present invention, non-essential) constituents, which need not here be considered. The potash content varies considerably, but may be assumed to be, roughly from 4 to 7%, perhaps averaging around 6% for the grades or qualities readily available in almost unlimited quantities. Other similar silicate materials containing iron and potassium may be employed in place of the greensand, if so desired.

As a "converting agent," for use in the process I preferably employ sodium chlorid, of which material a crude commercial product is entirely suitable. Instead of sodium chlorid, other chlorids may be employed, but for most purposes sodium chlorid, being cheap and efficient, is preferable.

With the above materials, I also preferably employ a material which upon calcination leaves lime or equivalent, for which purposes "lime sand", a material which in many places is found in beds adjacent to, or in the neighborhood of the greensand deposits. Of this material, a typical sample gave the following analysis,

| | |
|---|---|
| $CaCO_3$ | 71.12% |
| $MgCO_3$ | 3.81% |
| $Fe_2O_3$ and $Al_2O_3$ | 6.72% |
| $SiO_2$ | 14.38% |
| $K_2O$ | .48% | showing it to be essentially an impure form of calcium carbonate. Instead of this material other forms of calcium carbonate can be employed, e. g. chalk, marble and especially ordinary marl, or sludges consisting essentially of $CaCO_3$, from various manufacturing processes.

The lime sand and marl recommend themselves on account of the fact that these are found in large deposits located near to the greensand beds, and moreover both these materials are readily crushed or ground without excessive use of power, and can in many cases be mined cheaply by the use of steam shovels without the necessity of drilling, blasting, etc.

The lime sand is particularly suitable for the purpose for the reason that I have discovered that it contains some potassium compounds which are rendered soluble in the process. For this reason I prefer to use this material, when available. The "lime sand" or equivalent material, when the mixture is subjected to heat, is first decomposed, the calcium carbonate therein being first broken up to produce $CaO + CO_2$. Obviously lime itself could be used, or any material containing considerable amounts of $CaCO_3$, or other alkaline earth metal carbonates.

The procedure for the conversion of the potassium into a water-soluble state, may be conducted as follows:

The greensand, lime sand, and salt are mixed preferably in the proportions of about

| Greensand | 2000 lbs. |
|---|---|
| Limesand | 1000 to 1600 lbs. |
| Sodium chlorid | 700 lbs. |

The mixture is then ground, preferably so that 95% will pass through a screen having 100 meshes per linear inch, (which steps are preferably performed without first drying the two minerals, which are usually obtained from the beds in a somewhat damp state, or even in the form of a muddy mass or slurry) and the mixture is then fed into and through a rotary kiln in which it is heated up to about 800 to 820° C. which temperature should be rather closely adhered to, as any material elevation above 820° C. tends to partially fuse or clinker the mass and to volatilize some of the potassium compounds, or perhaps render the same insoluble, and a temperature much below 800° C. does not carry the reaction to completion, thus producing a considerably lower yield of soluble potassium salt.

During its passage through the rotary kiln, substantially the entire amount of the ferrous compounds present in the raw material will be converted into ferric compounds. It is found, however, that although the material, in passing through the rotary kiln, may have been heated for an hour or so, and although it may have been at or near the stated temperature of 800 to 820° C. for say ten minutes, the reaction will generally not be complete at this time, since a considerable percentage of the potassium content of the mass is still in an insoluble state. It is accordingly desirable to maintain the mass at or about the same temperature for a sufficient time to allow the completion of the reaction of the salt and iron potassium silicate. The iron now being completely oxidized it is not necessary to continue the oxidizing atmosphere. It is preferable to carry out this continuation of the heating operation, in a muffle rather than in a rotary kiln, to thereby prevent volatilization, and consequent loss of potassium compounds, it being well known that there is less volatilization in a muffle than in contact with a flame or with a strong current of gases, at the same temperature. To secure the conditions necessary for the further progress or completion of the reaction, the hot mixture will then be dropped into a "soaking pit" in which it is kept at or near the temperature of 800 to 820° C. for an hour more or less, to enable the completion of the reaction initiated in the rotary kiln. The material, which may have balled up more or less during the heating, is leached with water, preferably by systematically leaching with water while hot, the liquors clarified or filtered if necessary, concentrated, and the KCl and NaCl separately crystallized out, the KCl purified if desired and the NaCl returned to the first part of the process.

In the rotary kiln, it is preferable that the flame be so regulated that the hot gases only (and not the flame stuff) come into contact with the material, to prevent local overheating, and it is preferable that the gases contain sufficient free oxygen to be oxidizing in character, while in contact with the mixture being furnaced. This is for the reason that it is desired that the ferrous iron be converted completely into the ferric state, during the roasting process.

According to my investigations, the essential reactions which take place in the process as above described, are substantially as follows:—

First the heat dries the material and then dehydrates the glauconite. This latter is completed at a temperature of approximately 600° C. The dehydration tends to open up the glauconite and puts the same into a condition in which it is readily amenable to the subsequent chemical reactions. At this same time the ferrous compounds become oxidized to the ferric state. Beginning at the temperature of about 600° C. the $CaCO_3$ begins to give off its $CO_2$, with the formation of caustic lime. Beginning at about 700° C., an interchange takes place, between the NaCl and the potassium iron silicate to produce sodium iron silicate and potassium chlorid. For practical purposes I have found that it is desirable to carry the temperature to about 800 to 820° C., and to maintain it at such temperature until the reaction is completed. Some iron chlorid may be formed and this at once reacts with free lime to produce iron oxid and to form calcium chlorid.

In addition to these essential reactions, probably some lime unites with free silica present to produce silicates. Perhaps also some lime reacts with potassium iron silicate to produce calcium iron silicate, calcium ferrite, etc., liberating soluble potassium compounds.

I regard the reaction of the sodium chlorid on the potassium iron silicate as the most important as producing the major part of the conversion into soluble potassium salts.

Without limiting myself to specific apparatus, I desire to state that the process may be carried out in the apparatus of my copending application filed of even date herewith, Serial No. 162,852.

I claim:

1. The herein described process for the treatment of materials containing hydrous iron potassium silicate for the production of soluble potassium compounds, which comprises heating such silicate with a chlorid of an alkali-forming metal, in an oxidizing atmosphere, while in the presence of an alkali, at a temperature above 700° C., but below that necessary to produce any substantial clinkering of the mass; and thereafter maintaining the mass at an elevated temperature while under conditions incapable of inducing volatilization of the potassium chlorid, for a considerable period of time for the completion of the reaction.

2. In the treatment of materials containing hydrous iron potassium silicate for the production of soluble potassium compounds, the improvement which comprises heating such silicate with sodium chlorid, in an oxidizing atmosphere, while in the presence of an alkali, to a temperature above 700° C., but below that necessary to produce clinkering of the mass.

3. The process of treating materials containing hydrous iron potassium silicate for the production of soluble potassium compounds, which comprises heating such a silicate with a chlorid of an alkali-forming metal, in an oxidizing atmosphere while in the presence of lime, at a temperature above 700° C., but below that necessary to produce clinkering of the mass; and thereafter maintaining the mass at an elevated temperature while out of direct contact with the flames and the rapid currents of gases produced thereby, to prevent excessive vaporization of potassium chlorid.

4. In the treatment of materials containing hydrous iron potassium silicate for the production of soluble potassium compounds, the improvement which comprises reacting upon such silicate with a chlorid of an alkali-forming metal, while in the presence of a material which upon calcination leaves an alkaline earth metal oxid, to a temperature above 700° C., but below that necessary to produce clinkering of the mass; and after practically all of the iron has been oxidized, maintaining the temperature for a considerable time, to cause completion of the reaction.

5. The process which comprises roasting at a temperature above 700° C., but below that necessary to produce fusion, an intimate mixture containing glauconite, sodium chlorid and calcareous material, all in a finely divided state, to initiate a reaction for the conversion of the potassium into a soluble state; thereafter maintaining the mass for a protracted period, at a temperature suitable for the continuance of such reaction, and at the same time preventing excessive volatilization of potassium chlorid, and thereafter leaching the soluble material from the mass.

6. The process which comprises roasting at a temperature of about 800 to 820° C., an intimate mixture comprising glauconite, sodium chlorid and a calcareous material, all in a finely divided state, to initiate a reaction for the conversion of the potassium into a soluble state; thereafter maintaining the mass at a temperature approximately within the range of 800 to 820° C., for a protracted period for the continuance of such reaction, and at the same time preventing excessive volatilization of potassium chlorid, and thereafter leaching the soluble material from the mass.

7. The process which comprises roasting at a temperature above 700° C., but below that necessary to produce fusion of the mass, an intimate mixture comprising greensand marl, sodium chlorid and lime sand, all in a finely divided state, to initiate a reaction for the conversion of the potassium into a soluble state; maintaining the mass for a protracted period at the temperature stated, for the continuance of the reaction, and at the same time preventing excessive volatilization of potassium chlorid, and thereafter leaching the soluble material from the mass.

In testimony whereof I affix my signature.

FREDERICK TSCHIRNER.